(12) United States Patent
Corman et al.

(10) Patent No.: US 7,708,851 B2
(45) Date of Patent: May 4, 2010

(54) PROCESS OF PRODUCING A CERAMIC MATRIX COMPOSITE ARTICLE AND ARTICLE FORMED THEREBY

(75) Inventors: Gregory Scot Corman, Ballston Lake, NY (US); Henry Charles McGuigan, Duanesburg, NY (US); Milivoj Konstantin Brun, Ballston Lake, NY (US)

(73) Assignee: General Electric Company, Niskayuna, NY (US)

( * ) Notice: Subject to any disclaimer, the term of this patent is extended or adjusted under 35 U.S.C. 154(b) by 769 days.

(21) Appl. No.: 11/163,618

(22) Filed: Oct. 25, 2005

(65) Prior Publication Data

US 2007/0092762 A1 Apr. 26, 2007

(51) Int. Cl.
 *B32B 9/00* (2006.01)
(52) U.S. Cl. ................... 156/89.26; 156/89.11
(58) Field of Classification Search .............. 156/89.11, 156/89.25, 89.26
See application file for complete search history.

(56) References Cited

U.S. PATENT DOCUMENTS

| 4,626,516 | A |   | 12/1986 | Morelock |
|---|---|---|---|---|
| 5,015,540 | A |   | 5/1991 | Borom et al. ............... 428/698 |
| 5,067,998 | A | * | 11/1991 | Singh et al. ............... 156/89.26 |
| 5,067,999 | A | * | 11/1991 | Streckert et al. .......... 156/89.26 |
| 5,110,652 | A | * | 5/1992 | Allaire et al. ............... 428/114 |
| 5,223,064 | A |   | 6/1993 | Gadkaree ................. 156/89.25 |
| 5,250,243 | A | * | 10/1993 | Allaire et al. ............... 264/640 |
| 5,330,854 | A |   | 7/1994 | Singh et al. ................ 428/698 |
| 5,336,350 | A |   | 8/1994 | Singh .......................... 156/155 |
| 5,354,398 | A | * | 10/1994 | Kawai ...................... 156/89.26 |
| 5,368,934 | A |   | 11/1994 | Torii et al. |
| 5,589,115 | A | * | 12/1996 | Sherwood ................. 156/89.26 |
| 5,628,938 | A |   | 5/1997 | Sangeeta et al. ............... 264/28 |
| 5,840,221 | A |   | 11/1998 | Lau et al. |
| 5,902,756 | A | * | 5/1999 | Aly et al. ..................... 442/239 |
| 6,024,898 | A |   | 2/2000 | Steibel et al. ............... 264/29.1 |
| 6,258,737 | B1 | * | 7/2001 | Steibel et al. ............... 442/172 |
| 6,280,550 | B1 |   | 8/2001 | Steibel et al. |
| 6,284,357 | B1 | * | 9/2001 | Lackey et al. ............... 428/220 |
| 6,316,048 | B1 | * | 11/2001 | Steibel et al. ............... 427/180 |
| 6,403,158 | B1 |   | 6/2002 | Corman ...................... 427/295 |
| 6,503,441 | B2 |   | 1/2003 | Corman et al. ............... 264/635 |
| 6,541,134 | B1 | * | 4/2003 | Strangman et al. .......... 428/698 |
| 6,818,085 | B2 | * | 11/2004 | Behr et al. ................. 156/89.26 |
| 2002/0179225 | A1 | * | 12/2002 | Behr et al. ................. 156/89.13 |
| 2004/0028941 | A1 | * | 2/2004 | Lane et al. .................. 428/689 |
| 2004/0067316 | A1 |   | 4/2004 | Gray et al. ............... 427/376.1 |
| 2005/0136767 | A1 | * | 6/2005 | Ivkovich et al. ............. 442/265 |
| 2006/0147622 | A1 | * | 7/2006 | Gray .......................... 427/180 |
| 2006/0163773 | A1 | * | 7/2006 | Gray .......................... 264/270 |

* cited by examiner

*Primary Examiner*—James Sells
(74) *Attorney, Agent, or Firm*—Ann M. Agosti

(57) ABSTRACT

A CMC article and process for producing the article to have a layer on its surface that protects a reinforcement material within the article from damage. The method entails providing a body containing a ceramic reinforcement material in a matrix material that contains a precursor of a ceramic matrix material. A fraction of the reinforcement material is present and possibly exposed at a surface of the body. The body surface is then provided with a surface layer formed of a slurry containing a particulate material but lacking the reinforcement material of the body. The body and surface layer are heated to form the article by converting the precursor within the body to form the ceramic matrix material in which the reinforcement material is contained, and by converting the surface layer to form the protective layer that covers any fraction of the reinforcement material exposed at the body surface.

11 Claims, 4 Drawing Sheets

PROCESS OF PRODUCING A CERAMIC MATRIX COMPOSITE ARTICLE AND ARTICLE FORMED THEREBY

This invention was made with Government support under Agreement No. DE-FC02-92CE41000 awarded by the Department of Energy. The Government has certain rights in the invention.

BACKGROUND OF THE INVENTION

The present invention generally relates to ceramic matrix composite (CMC) materials and articles produced therefrom. More particularly, this invention is directed to method of forming a CMC article with a protective outer barrier layer that prevents damage to near-surface reinforcement material within the article.

CMC materials generally comprise a ceramic fiber reinforcement material embedded in a ceramic matrix material. The reinforcement material serves as the load-bearing constituent of the CMC in the event of a matrix crack, while the ceramic matrix protects the reinforcement material, maintains the orientation of its fibers, and serves to dissipate loads to the reinforcement material. Of particular interest to high-temperature applications are silicon-based composites, such as silicon carbide (SiC) as the matrix and/or reinforcement material. SiC fibers have been used as a reinforcement material for a variety of ceramic matrix materials, including SiC, TiC, $Si_3N_4$, and $Al_2O_3$. Continuous fiber reinforced ceramic composite (CFCC) materials are a type of CMC that offers light weight, high strength, and high stiffness for a variety of high temperature load-bearing applications. A CFCC material is generally characterized by continuous fibers (filaments) that may be arranged to form a unidirectional array of fibers, or bundled in tows that are arranged to form a unidirectional array of tows, or bundled in tows that are woven to form a two-dimensional fabric or woven or braided to form a three-dimensional fabric. For three-dimensional fabrics, sets of unidirectional tows may, for example, be interwoven transverse to each other. The individual tows may be coated with a release agent, such as boron nitride (BN) or carbon, forming a weak interface coating that allows for limited and controlled slip between the tows and the ceramic matrix material. As cracks develop in the CMC, one or more fibers bridging the crack act to redistribute the load to adjacent fibers and regions of the matrix material, thus inhibiting or at least slowing further propagation of the crack.

One technique for fabricating CMC's involves multiple layers of "prepreg," often in the form of a tape-like structure, comprising the reinforcement material of the desired CMC impregnated with a precursor of the CMC matrix material. The prepreg must undergo processing (including firing) to convert the precursor to the desired ceramic. Prepregs for CFCC materials frequently comprise a two-dimensional fiber array comprising a single layer of unidirectionally-aligned tows impregnated with a matrix precursor to create a generally two-dimensional laminate. Multiple plies of the resulting prepregs are stacked and debulked to form a laminate preform, a process referred to as "lay-up." The prepregs are typically arranged so that tows of the prepreg layers are oriented transverse (e.g., perpendicular) to each other, providing greater strength in the laminar plane of the preform (corresponding to the principal (load-bearing) directions of the final CMC component).

Following lay-up, the laminate preform will typically undergo debulking and curing while subjected to applied pressure and an elevated temperature, such as in an autoclave. In the case of melt-infiltrated (MI) CMC articles, the debulked and cured preform undergoes additional processing. First the preform is heated in vacuum or in an inert atmosphere in order to decompose the organic binders, at least one of which pyrolyzes during this heat treatment to form a carbon char, and produces a porous preform for melt infiltration. Further heating, either as part of the same heat cycle as the binder burn-out step or in an independent subsequent heating step, the preform is melt infiltrated, such as with molten silicon supplied externally. The molten silicon infiltrates into the porosity, reacts with the carbon constituent of the matrix to form silicon carbide, and fills the porosity to yield the desired CMC component.

Examples of SiC/Si—SiC (fiber/matrix) CFCC materials and processes are disclosed in commonly-assigned U.S. Pat. Nos. 5,015,540, 5,330,854, 5,336,350, 5,628,938, 6,024,898, 6,258,737, 6,403,158, and 6,503,441, and commonly-assigned U.S. Patent Application Publication No. 2004/0067316. An example of a CFCC material is depicted in FIG. 1, which represents a surface region of a CFCC component 10 as comprising multiple laminae 12, each derived from an individual prepreg that comprised unidirectionally-aligned tows 14 impregnated with a ceramic matrix precursor. As a result, each lamina 12 contains unidirectionally-aligned fibers 15 encased in a ceramic matrix 16 formed by conversion of the ceramic matrix precursor during firing and melt infiltration.

In order to maximize the mechanical properties of CMC's, particularly the prepreg MI-type of CMC, it is important to have the reinforcement material well dispersed within the composite matrix. As evident from FIG. 1, such a dispersion inherently places a fraction of the reinforcement material near the surface of the composite where it is susceptible to damage due to handling, machining, surface preparation for subsequent processing steps such as deposition of an environmental barrier coating (EBC), or oxidation attack at high temperature. A cross-section of a prepreg MI-type CMC containing dispersed reinforcement fibers is shown in FIG. 3. A significant number of reinforcement fibers can be seen relatively close to the surface (within about 0.005 inch (about 125 mm), and therefore susceptible to damage.

In view of the above, it would be beneficial to protect near-surface reinforcement materials in CMC's. However, doing so must not compromise the mechanical, thermal, or structural properties of the composite, and must be chemically and thermally (identical thermal expansion) compatible with the bulk of the CMC material.

BRIEF SUMMARY OF THE INVENTION

The present invention provides a CMC article and a process for producing the CMC article to have an outer barrier layer on its surface that protects the reinforcement material within the article from physical damage during subsequent handling, machining, and surface treatments, and chemical/oxidation damage at high temperature.

The method of this invention generally entails providing a body containing a ceramic reinforcement material in a matrix material that contains a precursor of a ceramic matrix material. A fraction of the reinforcement material is present and possibly exposed at a surface of the body. A surface layer is then deposited on the surface of the body to define an outermost surface of the body. The surface layer comprises a slurry containing a particulate material, but lacks the reinforcement material of the body. The body and the surface layer thereon are then heated to form a CMC article comprising a ceramic protective layer on a ceramic matrix composite substrate.

More particularly, the surface layer is converted to form the ceramic protective layer and the precursor within the body is converted to form the ceramic matrix material in which the ceramic reinforcement material is contained so as to yield the ceramic matrix composite substrate. The ceramic protective layer defines an outermost surface of the CMC article and covers the fraction of the reinforcement material that was originally exposed at the surface of the body. In preferred embodiments of the invention, the surface layer originally deposited on the body may contain chopped or milled carbon fiber or a semicontinuous carbon fiber sheet to inhibit shrinkage cracking during subsequent processing of the body, including its conversion to form the protective layer of the CMC.

According to a preferred aspect of the invention, the protective layer defining the outermost surface of the CMC article protects the near-surface reinforcement material within the CMC article from handling damage, and also provides a nominal amount of material at the CMC surface that is capable of being machined without damaging the underlying reinforcement material. The latter aspect is especially beneficial for applications where an EBC coating is to be applied to the CMC, in which case a surface roughening treatment is typically performed such as by abrasive grit blasting to promote coating adhesion. Because the protective layer lacks reinforcement material and therefore the weak interface coatings normally applied to reinforcement materials, the protective layer can be substantially harder than the underlying CMC, allowing for a more aggressive grit blasting treatment during clean-up of the article following infiltration or during surface preparation for EBC application. In applications where the CMC will be subjected to high temperature exposures in air or combustion gases, the protective layer provides a barrier that will oxidize and/or volatilize before the fiber-containing material of CMC is subjected to attack, thus extending the time before any mechanical degradation of the CMC article will occur.

Other objects and advantages of this invention will be better appreciated from the following detailed description.

DETAILED DESCRIPTION OF THE INVENTION

Figure 1:
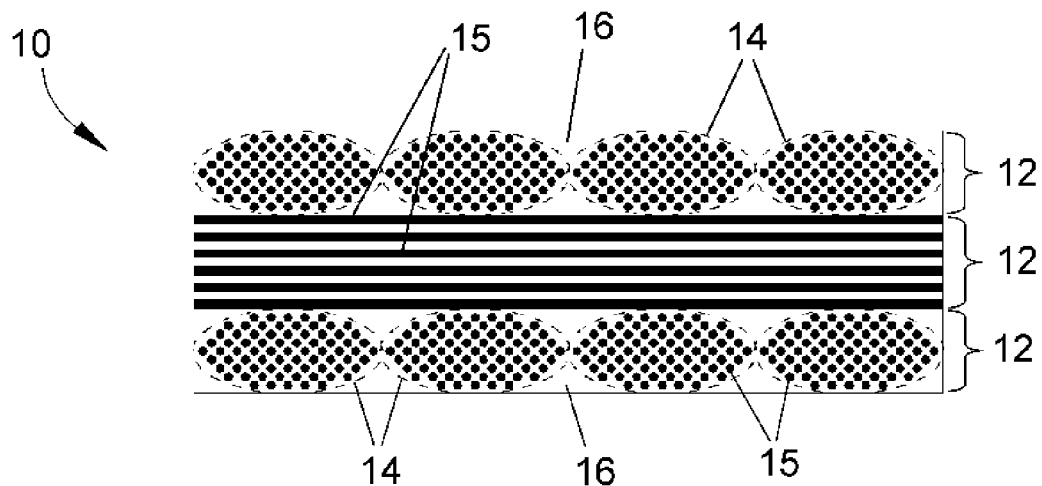
FIG. 1 schematically represents a fragmentary cross-sectional view of a CMC article in accordance with the prior art.
Figure 2:
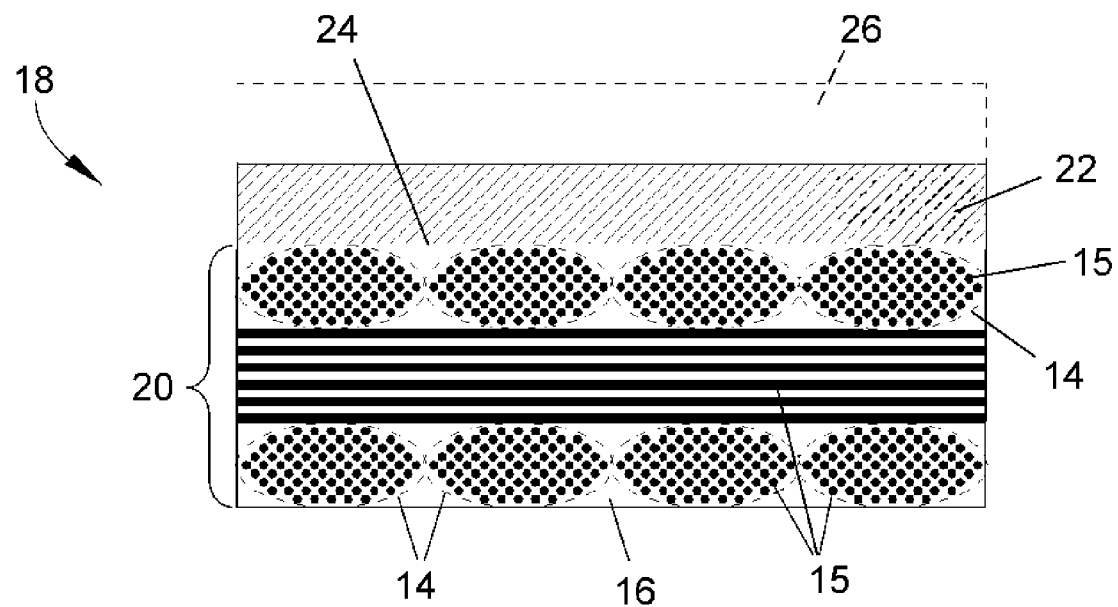
FIG. 2 schematically represents a fragmentary cross-sectional view of a CMC article with a protective layer in accordance with the present invention.
Figure 3:
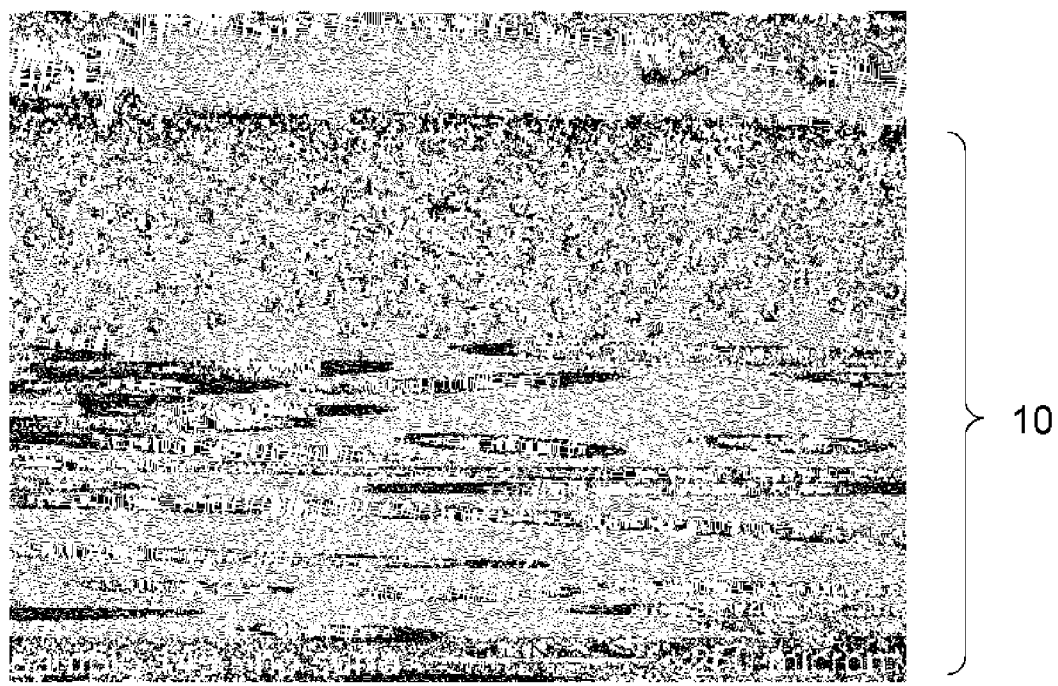
FIG. 3 is a scanned photomicrograph image showing a cross-section of a CMC article without a protective layer in accordance with the prior art, and shows reinforcing fibers concentrated near the surface of the article where they are susceptible to mechanical or chemical (oxidation) damage.

The present invention is directed to protecting the outer surface of a CMC article with an outer protective layer. As schematically represented in FIG. 2, a CMC component 18 is shown as having a CMC substrate 20 that is essentially the same as the component 10 of FIG. 1, but over which a protective layer 22 has been formed to define an outermost surface 24 of the component 18. The protective layer 22 lacks any reinforcing material, such as the tows 14 of the underlying substrate 20 of the CMC component 18. Instead, the protective layer 22 is primarily and potentially entirely formed of a ceramic material, which can be formulated to be essentially identical to the ceramic matrix material 16 of the CMC component 18. The manner in which the protective layer 22 is applied to the CMC component 18 can vary depending on the particular process techniques used to produce the component 18. In the particular case of prepreg MI-CMC's of the type represented in FIG. 2, various techniques are possible including dipping or spray coating a precursor of the protective layer 22. A particularly preferred approach to applying the protective layer 22 to a prepreg MI-CMC composite such as the CMC component 18 is to laminate a matrix-rich, reinforcement-free tape to the surface of the composite preform during composite lay-up. By forming the protective layer 22 to have essentially the same chemical composition as the underlying matrix material 16 of the CMC substrate 20, the protective layer 22 is more likely to be fully compatible with the substrate 20.

In preferred embodiments of this invention, the matrix 16 of the CMC component 18 is formed by a silicon MI process, such that the matrix 16 contains SiC and some free silicon. Preferred materials and processing techniques for the component 18 are disclosed in commonly-assigned U.S. Pat. Nos. 5,015,540, 5,330,854, 5,336,350, 5,628,938, 6,024,898, 6,258,737, 6,403,158, and 6,503,441, and commonly-assigned U.S. Patent Application Publication No. 2004/0067316, whose disclosures relating to compositions and processing of CMC's are incorporated herein by reference. In accordance with these commonly-assigned patents, a preferred material for the tows 14 is SiC fibers, such that the component 18 may be referred to as a SiC/Si—SiC (fiber/matrix) CMC. A notable commercial example of a material suitable for the tows 14 is HI-NICALON® from Nippon Carbon Co., Ltd. A suitable range for the diameters of the tows 14 is about two to about twenty micrometers, though fibers with larger and smaller diameters are also within the scope of this invention. Also consistent with the aforementioned patents, the fibers 15 are preferably coated with materials to impart certain desired properties to the CMC substrate 20, such as a carbon or boron nitride interface layer (not shown) over which a SiC or $Si_3N_4$ coating (not shown) may be deposited to protect the fibers 15 during melt infiltration. According to known practices, such interface layers and SiC or $Si_3N_4$ coatings can be deposited by CVI, though other deposition techniques are also possible. Those skilled in the art will appreciate that the teachings of this invention are also applicable to other CMC material combinations, and that such combinations are within the scope of this invention.

Figure 4:
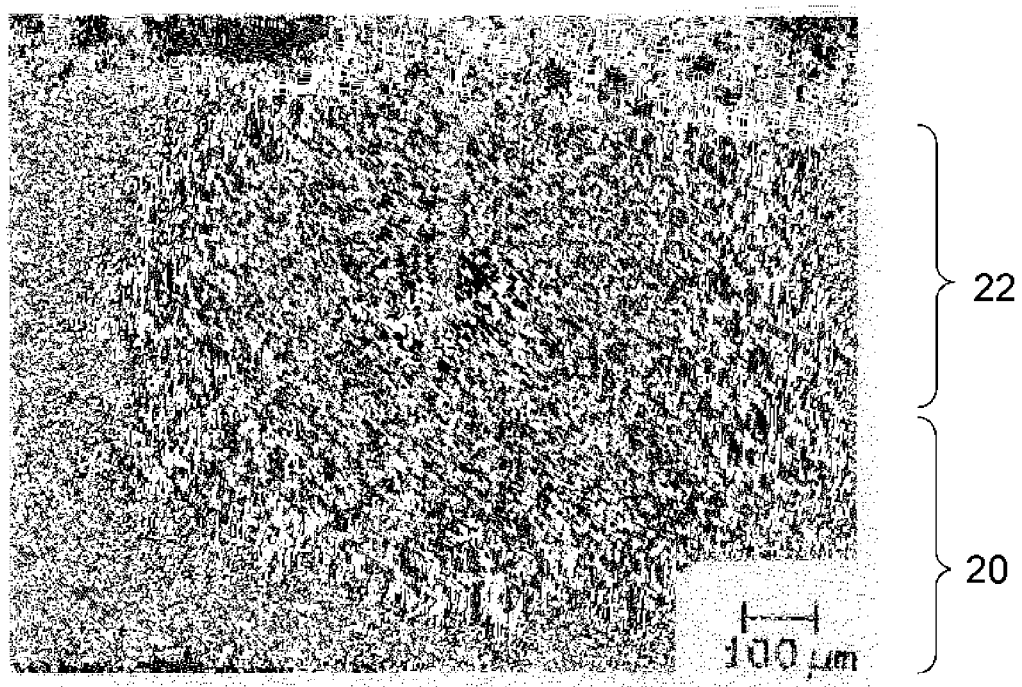
FIG. 4 is a scanned photomicrograph image showing a cross-section of a CMC article with a filler-free protective layer in accordance with a first embodiment of this invention.

FIG. 4 is a scanned photomicrograph image of a partial cross-section through a CMC substrate 20 on whose outer surface a tape was laminated prior to firing and which on firing yielded an outer protective layer 22 in accordance with a first embodiment of the invention. The CMC substrate 20 was produced with a reinforcement material of tow formed from HI-NICALON® fibers. The fibers were coated with successive layers of boron nitride, carbon, silicon nitride, and carbon. A preform of the CMC substrate 20 was produced by laying-up impregnated prepreg tapes, each containing the reinforcement material and slurry cast with a matrix slurry containing, by mass, about 25% SiC powder, about 11% carbon powder, about 16% organic binders, and about 48% solvents for the binders. The tape for the protective layer 22 was tape cast as a thin sheet of the same matrix slurry used in the fabrication of the underlying CMC substrate 20. As a result, the protective layer 22 was compositionally identical to the ceramic matrix of the substrate 20, but lacked any reinforcement material. The thickness of the tape was about 0.4 mm, which resulted in the protective layer 22 also having a final thickness of about 0.4 mm. After lay-up of the tapes for the CMC substrate 20 to produce the preform, the tape for the protective layer 22 was laminated to the surface of the preform and subsequently the entire laminated structure underwent autoclaving, binder burn-out, and molten silicon infiltration using standard practices to yield the specimen shown in FIG. 4.

As evident from FIG. 4, though the above process was effective in producing a protective layer 22 on the surface of the composite substrate 20, the layer 22 was prone to cracking during the burn-out and infiltration steps. One such crack can be seen in FIG. 4, and was concluded to be caused by the small but finite shrinkage (e.g., typically less than 0.5%) of the matrix-only layer 22 during processing. Within the composite substrate 20, shrinkage of the matrix is restricted by the presence of the reinforcement material. It was concluded that the small amount of shrinkage that occurred in the matrix-only protective layer 22 was sufficient to produce relatively large matrix cracks.

To substantially eliminate the tendency for cracking of the protective layer 22, carbon-containing filamentary material can be added to the slurry used to form the protective layer 22. For example, chopped or milled carbon fibers can be substituted for part or all of the carbon particulate of the matrix slurry for the protective layer 22, or a tape used to form the protective layer 22 can be processed to incorporate a thin, porous, non-directional (random) carbon paper or mat as a carrier for the matrix slurry. Such carbon-containing filamentary materials are believed to be largely, though not entirely, consumed during infiltration with molten silicon as a result of reacting with silicon to form silicon carbide. Any residual amount of carbon remaining is believed to be in sufficiently small amounts to have no effect on the mechanical or thermal stability or oxidation resistance of the protective layer 22 or the composite 10 as a whole. In addition to or instead of carbon, other compatible materials could foreseeably be used as the material for the chopped fiber or fiber mat, such as silicon carbide. It is also possible that a polymeric fiber (e.g., a nylon, cellulose, polyethylene, etc.) could be used as the fiber material, as long as such materials pyrolyze to carbon during binder burn-out and thus do not contaminate the protective layer 22.

The addition of chopped or milled carbon fibers to the matrix slurry can be easily accomplished by simply substituting the carbon fibers for part or all of the carbon particulate used in the matrix slurry. The slurry can then be applied by dipping or spraying the CMC preform, or tape casting the slurry to form a tape that can be laminated to the CMC preform. A carbon mat can be easily incorporated by an impregnation step in which the matrix slurry is deposited on the mat and forced into the mat by wiping with a plastic blade or squeegee. An advantage of the latter is that the thickness of the tape can be readily controlled to be roughly that of the carbon mat. The semi-continuous nature of the carbon fiber or carbon mat acts as a rigid frame within the tape and suppresses shrinkage during tape cure, burn-out and infiltration. By reducing shrinkage, the protective layer 22 is made more compatible with the underlying CMC substrate 20 and surface shrinkage cracks are avoided.

Tapes and composite laminate preforms were produced in the same manner as described above for the specimen of FIG. 4, but with one of the tapes for the protective layer 22 produced from a matrix slurry containing chopped carbon fibers and a second tape produced from a matrix slurry containing a carbon mat. The chopped carbon fiber material used was Fortafil 342 purchased from Toho Tenax America, Inc., and had nominal diameters of about six to seven micrometers and nominal lengths of from less than 100 to about 450 micrometers. The fibers were randomly dispersed in the matrix slurry, and consequently were generally randomly dispersed in the tape cast from the slurry. However, during tape casting there was a tendency for fibers to become oriented within the plane of the tape. The chopped carbon fiber was substituted for all of the carbon particulate of the matrix slurry, and resulted in a carbon fiber content of about twenty volume percent within the cast and dried tape.

Figure 7:
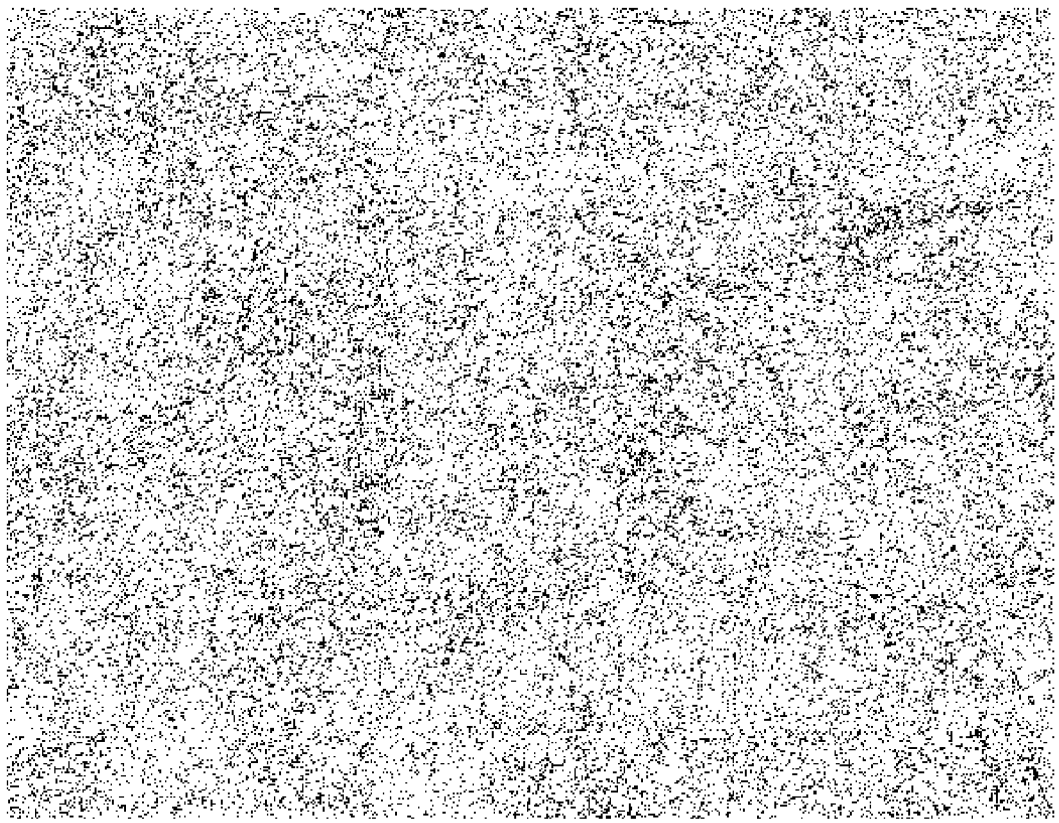
FIG. 7 is a scanned image of a carbon mat of the type used to produce the CMC article of FIG. 6.

The carbon mat was a low density, non-directional carbon paper with a thickness of about 75 to about 125 micrometers, and was incorporated into the tape by impregnation with the matrix slurry. The carbon mat contained carbon fiber approximately 2.5 cm in length distributed randomly in two dimensions within the plane of the mat. The random carbon fibers constituted approximately 4% of the volume occupied by the mat, the remaining 96% of the volume being void. Suitable carbon mat materials are commercially available from Aerospace Composite Products of Livermore, Calif., under the designations "MC-03 0.2 oz carbon mat" and "MC-06 0.5 oz carbon mat," an example of which is shown in FIG. 7. It should be understood that other similarly constructed carbon mat materials would be equally suitable. The standard composition slurry with fine particulate carbon was used to impregnate the carbon mat, giving a total carbon content of about 24 volume percent in the tape.

Figure 5:
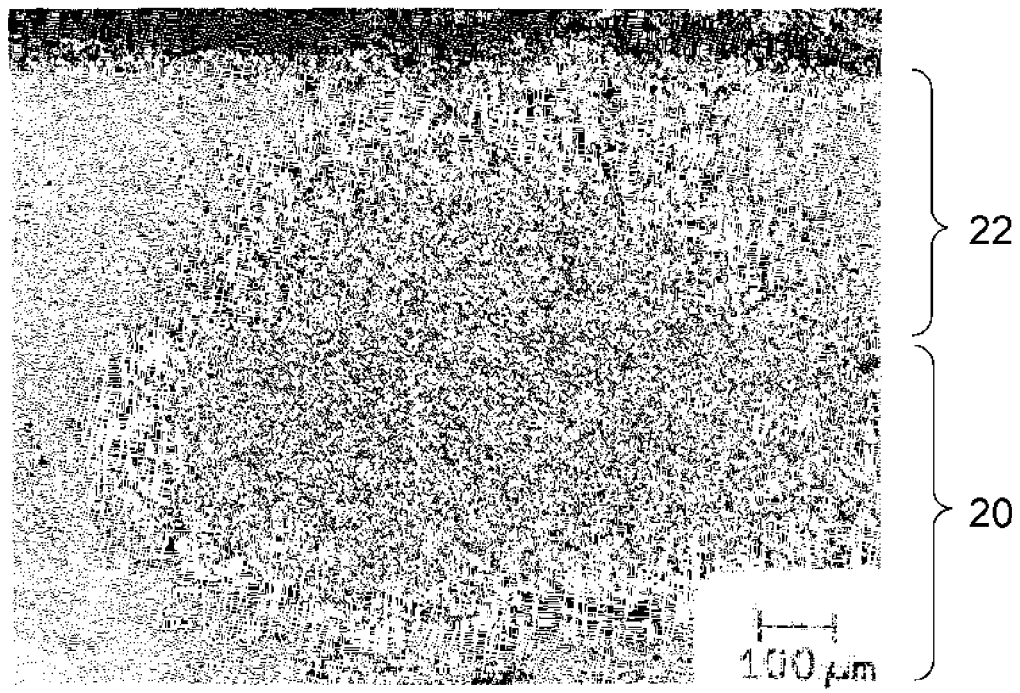
FIGS. 5 and 6 are scanned photomicrograph images showing cross-sections of CMC articles with protective layers containing fillers formed of, respectively, chopped carbon fibers and a semicontinuous carbon fiber mat in accordance with additional embodiments of this invention.
Figure 6:
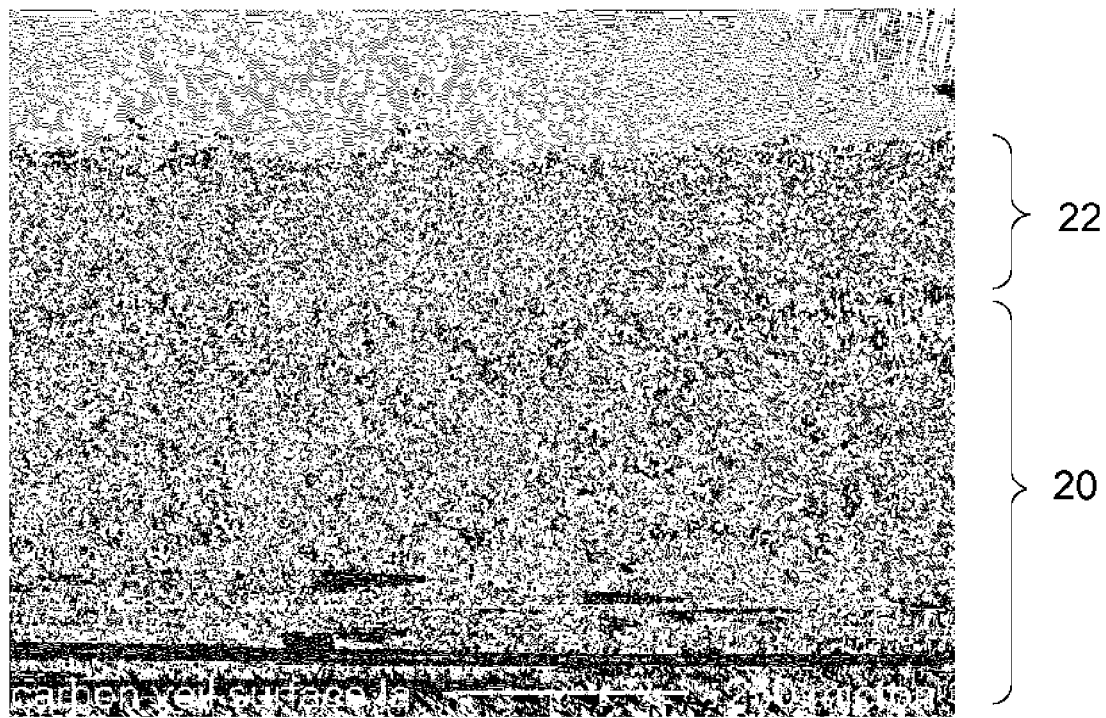

FIG. 5 is a scanned photomicrograph of a CMC panel whose composite laminate substrate 20 is protected by a layer 22 produced from the fiber-filled tape. As evident from FIG. 5, the protective layer 22 is free of shrinkage cracks seen in FIG. 4. FIG. 6 is a scanned photomicrograph of a CMC panel whose composite laminate substrate 20 is protected by a layer 22 produced with the mat-containing tape. Again, the protective layer 22 can be seen to be free of shrinkage cracks.

The above investigations evidenced that a protective layer 22 capable of protecting near-surface reinforcement material of a CMC substrate 20 could be formed by an unreinforced layer of the same slurry used to form the ceramic matrix of the CMC substrate 20. As a result of being formed of a CMC matrix material, the protective layer 22 is believed to be capable of protecting CMC substrates from damage by a variety of sources, including handling and oxidation. In the absence of reinforcement material and the weak interface coatings often applied thereto, the protective layer 22 can withstand machining and other aggressive surface treatments, particularly in the case where the surface of a CMC component must be roughened by grit blasting to clean the surface or promote adhesion of a coating subsequently applied to the component. An example of the latter is an EBC 26 represented in phantom in FIG. 2. Suitable EBC materials are disclosed in commonly-assigned U.S. Pat. Nos. 5,985,470, 6,444,335, 6,558,814, 6,610,385, 6,699,607, 6,740,364, and 6,787,195, and U.S. patent application Ser. Nos. 10/709,288, 11/160,185, and 11/160,212, as well as U.S. Pat. Nos. 6,254,935, 6,352,790, 6,365,288, 6,387,456, and 6,410,148. The disclosures of these patent and patent applications relating to compositions and processing of EBC's are incorporated herein by reference.

While the invention has been described in terms of particular embodiments, it is apparent that other forms could be adopted by one skilled in the art. Therefore, the scope of the invention is to be limited only by the following claims.

What is claimed is:

1. A method of producing a ceramic matrix composite article, the method comprising the steps of:
    forming a preform by laying-up a plurality of prepreg tapes each comprising a silicon carbide-containing continuous fiber reinforcement material in a matrix material containing a precursor of a ceramic matrix material, a fraction of the reinforcement material being at a surface of the preform;
    forming on the surface of the preform a surface layer comprising a slurry containing a carbon-containing particulate material, the surface layer defining an outermost surface of the preform and lacking the reinforcement material of the preform; and then
    melt infiltrating the preform with molten silicon and heating the preform and the surface layer thereon to form the ceramic matrix composite article comprising a ceramic protective layer on a ceramic matrix composite substrate by converting the precursor and the molten silicon within the preform to form the ceramic matrix material in which the reinforcement material is contained so as to yield the ceramic matrix composite substrate and by converting the surface layer to form the outermost ceramic protective layer that covers the fraction of the reinforcement material that was at the surface of the preform, the outermost ceramic protective layer being predominantly a ceramic material that has the same chemical composition as the ceramic matrix material of the ceramic matrix composite substrate.

2. The method according to claim 1, wherein the surface layer is formed by forming a tape comprising the slurry containing the carbon-containing particulate material and lacking the reinforcement material of the preform, and then laminating the tape to the surface of the preform to form the surface layer.

3. The method according to claim 1, wherein the surface layer contains a dispersion of chopped carbon fibers in an amount sufficient to suppress shrinkage and cracking of the surface layer during conversion to the outermost ceramic protective layer.

4. The method according to claim 1, wherein the surface layer contains a porous carbon sheet oriented substantially parallel to the surface of the preform, the porous carbon sheet suppressing shrinkage and cracking of the surface layer during conversion to the outermost ceramic protective layer.

5. The method according to claim 1, the method further comprising the steps of:
    roughening the outermost ceramic protective layer of the ceramic matrix composite article; and then
    depositing an environmental barrier coating on the roughened outermost ceramic protective layer.

6. The method according to claim 1, wherein the protective layer is harder than the ceramic matrix composite substrate.

7. A method of producing a ceramic matrix composite article, the method comprising the steps of:
    providing a body containing a ceramic reinforcement material in a matrix material containing a precursor of a ceramic matrix material, a fraction of the reinforcement material being at a surface of the body;
    forming on the surface of the body a surface layer comprising a slurry containing a particulate material, the surface layer defining an outermost surface of the body and lacking the reinforcement material of the body and containing a dispersion of carbon fibers in an amount sufficient to suppress shrinkage and cracking of the surface layer during conversion to the protective layer; and then
    heating the body and the surface layer thereon to form the ceramic matrix composite article comprising a ceramic protective layer on a ceramic matrix composite substrate by converting the precursor within the body to form the ceramic matrix material in which the ceramic reinforcement material is contained so as to yield the ceramic matrix composite substrate and by converting the surface layer to form the ceramic protective layer that defines an outermost surface of the ceramic matrix composite article and covers the fraction of the reinforcement material that was at the surface of the body.

8. A method of producing a ceramic matrix composite article, the method comprising the steps of:
    providing a body containing a ceramic reinforcement material in a matrix material containing a precursor of a ceramic matrix material, a fraction of the reinforcement material being at a surface of the body;
    forming on the surface of the body a surface layer comprising a slurry containing a particulate material, the surface layer defining an outermost surface of the body and lacking the reinforcement material of the body and containing a porous carbon sheet oriented substantially parallel to the surface of the body, the porous carbon sheet suppressing shrinkage and cracking of the surface layer during conversion to the protective layer; and then
    heating the body and the surface layer thereon to form the ceramic matrix composite article comprising a ceramic protective layer on a ceramic matrix composite substrate by converting the precursor within the body to form the ceramic matrix material in which the ceramic reinforcement material is contained so as to yield the ceramic matrix composite substrate and by converting the surface layer to form the ceramic protective layer that defines an outermost surface of the ceramic matrix composite article and covers the fraction of the reinforcement material that was at the surface of the body.

9. A method of producing a ceramic matrix composite article, the method comprising the steps of:
    providing a body containing a ceramic reinforcement material in a matrix material containing a precursor of a ceramic matrix material, a fraction of the reinforcement material being at a surface of the body;
    laminating to the surface of the body a tape comprising a slurry containing a particulate material, the surface layer defining an outermost surface of the body and lacking the reinforcement material of the body; and then
    heating the body and the surface layer thereon to form the ceramic matrix composite article comprising a ceramic protective layer on a ceramic matrix composite substrate by converting the precursor within the body to form the ceramic matrix material in which the ceramic reinforcement material is contained so as to yield the ceramic matrix composite substrate and by converting the surface layer to form the ceramic protective layer that defines an outermost surface of the ceramic matrix composite article and covers the fraction of the reinforcement material that was at the surface of the body.

10. The method according to claim 9, wherein the body is formed by laying-up a plurality of prepreg tapes, each of the tapes containing a portion of the ceramic reinforcement material in a portion of the matrix material.

11. A method of producing a ceramic matrix composite article, the method comprising the steps of:

providing a body containing a ceramic reinforcement material in a matrix material containing a precursor of a ceramic matrix material, a fraction of the reinforcement material being at a surface of the body;

melt infiltrating the body with a melt infiltration material comprising molten silicon;

forming on the surface of the body a surface layer comprising a slurry containing a particulate material, the surface layer defining an outermost surface of the body and lacking the reinforcement material of the body;

heating the body and the surface layer thereon to form the ceramic matrix composite article comprising a ceramic protective layer on a ceramic matrix composite substrate by reacting the melt infiltration material with the precursor within the body to form the ceramic matrix material comprising silicon carbide in which the ceramic reinforcement material is contained so as to yield the ceramic matrix composite substrate and by converting the surface layer to form the ceramic protective layer that defines an outermost surface of the ceramic matrix composite article and covers the fraction of the reinforcement material that was at the surface of the body;

roughening the outermost surface of the ceramic matrix composite article; and then depositing an environmental barrier coating on the roughened outermost surface.

* * * * *